United States Patent [19]

Franklin et al.

[11] Patent Number: 4,506,803

[45] Date of Patent: Mar. 26, 1985

[54] METERED AEROSOL DISPENSER AND METHOD OF USING THE DISPENSER

[75] Inventors: Michael L. Franklin; Fang-Chung Chen, both of Parsippany, N.J.

[73] Assignee: Hoffmann-La Roche Inc., Nutley, N.J.

[21] Appl. No.: 406,421

[22] Filed: Aug. 9, 1982

[51] Int. Cl.³ ............................................. B65D 83/14
[52] U.S. Cl. ..................................... 222/1; 222/402.2
[58] Field of Search .................. 222/402.1, 402.2, 453, 222/451, 1; 137/627.5, 630.16; 251/344, 348, 347, 353-354

[56] References Cited

U.S. PATENT DOCUMENTS

| | | |
|---|---|---|
| 2,812,884 | 11/1957 | Ward . |
| 2,858,053 | 10/1958 | Waldherr . |
| 3,052,382 | 9/1962 | Gawthrop .................... 222/402.2 X |
| 3,174,659 | 3/1965 | Sorber et al. .............. 222/402.15 X |
| 3,176,887 | 4/1965 | Potapenko et al. . |
| 3,176,890 | 4/1965 | Potapenko et al. ............. 222/402.2 |
| 3,269,615 | 8/1966 | Ferry . |
| 3,499,584 | 3/1970 | Warren ............................. 222/402.2 |
| 3,605,738 | 9/1971 | Ciranno . |

FOREIGN PATENT DOCUMENTS

| | | | |
|---|---|---|---|
| 1299724 | 6/1962 | France ............................ 222/402.2 |
| 1162684 | 8/1969 | United Kingdom . |
| 1336379 | 11/1973 | United Kingdom ............. 222/402.2 |

*Primary Examiner*—Charles A. Marmor
*Attorney, Agent, or Firm*—Jon S. Saxe; Bernard S. Leon; George W. Johnston

[57] ABSTRACT

An aerosol dispenser dispenses the contents of a metering chamber by depression of a slidable stem which extends through the metering chamber and into the main fluid reservoir of the dispenser. The stem includes a dispensing passage which lies within one of a pair of chamber sealing sleeves when the stem is in a rest position, thus fluidically isolating the exterior of the apparatus from the metering chamber. In this position, the metering chamber and the main reservoir are also fluidically isolated from each other. After shaking the dispenser to mix its contents, i.e., an active agent and propellant, the stem is then depressed into a charging position in which the dispensing passage is placed into engagement with an additional sealing sleeve mounted within the metering chamber to fluidically isolate the metering chamber from the exterior of the dispenser. Simultaneously, the bypass passage is positioned to straddle the other chamber sealing sleeve, and to thus fluidically connect the main reservoir to the metering chamber, which is then charged with the active agent and propellant from the reservoir. The stem is then released, and a spring drives the stem towards its first rest position. During this movement, the apparatus is in its dispensing position, and the contents of the charged metering chamber are dispensed through the dispensing passage exteriorly of the apparatus. After each metered dose is dispensed, the stem returns to its rest position, and the metering chamber is again fluidically isolated from both the reservoir and the exterior of the dispenser.

20 Claims, 8 Drawing Figures

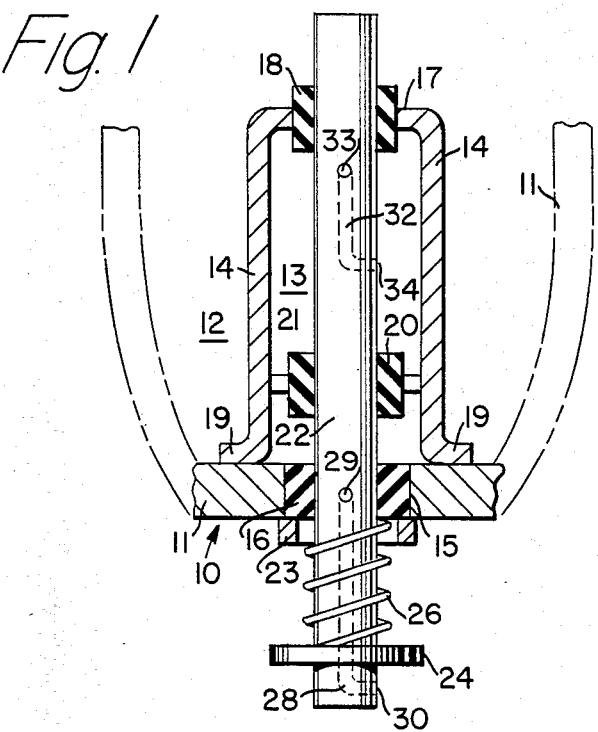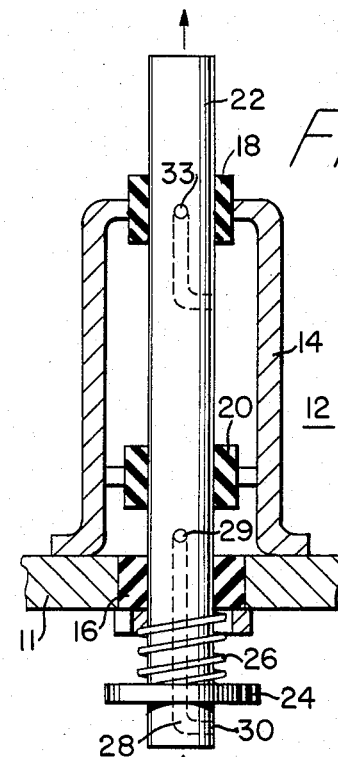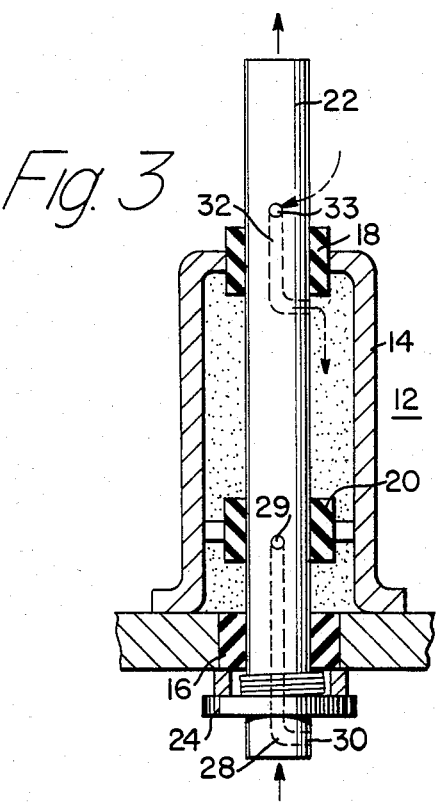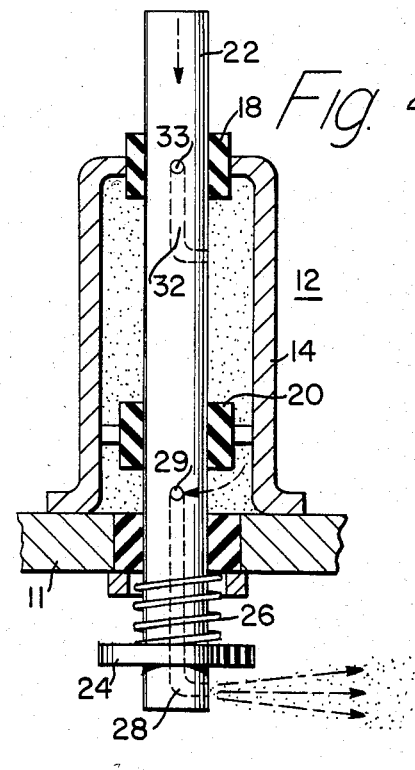

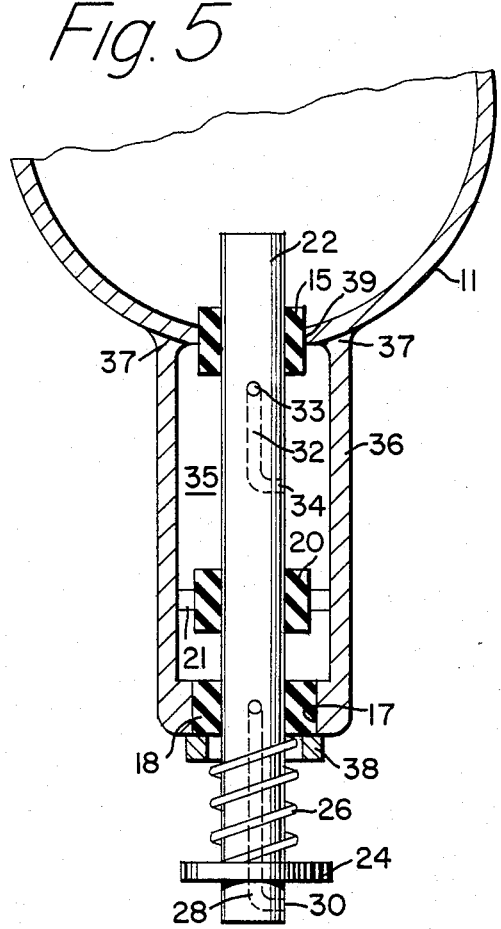
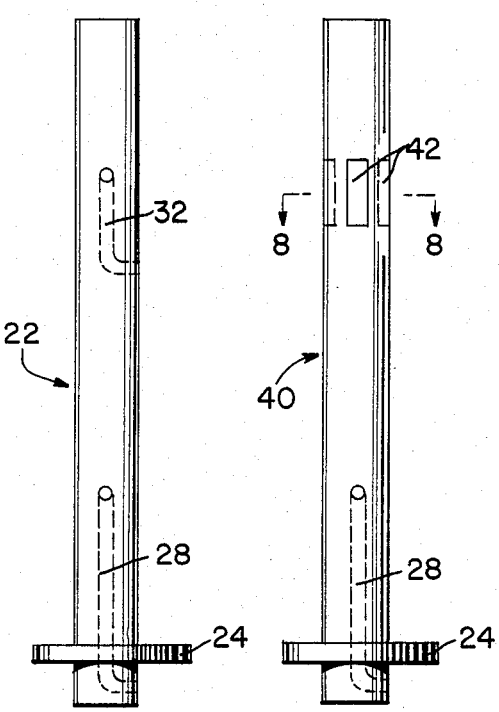
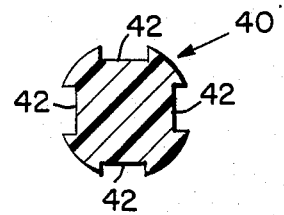

METERED AEROSOL DISPENSER AND METHOD OF USING THE DISPENSER

TECHNICAL FIELD

This invention relates to a metered aerosol dispenser and a method of using the dispenser, and is particularly suitable for dispensing precisely-metered doses of an active agent, such as a drug, suspended in a solution, an emulsion, or a carrier.

BACKGROUND ART

Conventional dispensing systems for selectively dispensing metered doses generally include a metering chamber which holds a measured amount of active ingredient to be dispensed at a later time. If the dispensing system results in charging the metering chamber upon completion of a dispensing process, the charge will remain in the metering chamber until the next dispensing process. Where the time between dispensing consecutive doses is relatively long, phase separation (partition) will occur, resulting in settling of the active ingredient in a non-uniform fashion inside the metering chamber. This problem occurs whether the active ingredient is in an emulsion or in a suspension. In all cases, even for solutions, an air vapor pocket is present as a result of the conventional pressure process for filling the dispensing apparatus. Some of the air pocket can enter the metering chamber along with a charge, thereby reducing the amount of active agent in the metering chamber.

Conventional dispensing systems include a spring-biased stem positioned in a metering chamber for providing a conduit through which a dose is dispensed. This is often disadvantageous when the spring is inside the metering chamber, because the active agent is likely to adhere to the spring and adversely affect the quantity of active agent that is actually dispensed. This has a deleterious effect upon the functioning of dispensing apparatus for delivering consistently uniform doses of material.

In conventional drug dispensers having a filling port or bypass conduit connecting the metering chamber to the main reservoir, the active agent may migrate between dispensing operation. If this occurs, the amount of active agent present in the chamber will be non-uniform from one dispensing operation to another; this helps to explain the dose to dose variability experienced with existing dispensers.

In order to combat the non-uniformity of dosing, many conventional dispensing devices are unnecessarily large and produce an unpleasant cold sensation when used for nasal drug administration. The cold sensation results from an undesirably large amount of propellant, e.g., Freon, which must be present in the metering chamber for dispensing a predetermined amount of drug or other material. In addition, the container must be significantly larger, increasing material and packaging costs.

It is, therefore, an object of the present invention to provide a new and improved metered aerosol dispenser and method of using such dispenser which overcome all of the above-stated disadvantages of conventional drug dispensers, and which provide a simpler construction and mode of operation than known dispensers.

DISCLOSURE OF INVENTION

The aerosol dispensing apparatus is capable of dispensing metered amounts of fluid material from a main reservoir. It includes a metering chamber having a pair of apertures that respectively connect the metering chamber to the main reservoir and to the exterior of the metering chamber. A chamber sealing sleeve is mounted within each of the apertures. An additional sealing sleeve is mounted within the metering chamber, and all of the sleeves are in substantial alignment. A slidable stem has a dispensing passage and a bypass passage, and is positioned within and cooperable with the sleeves. The bypass passage is adapted to selectively fluidically interconnect the main reservoir with the metering chamber. The dispensing passage is adapted to selectively fluidically interconnect the metering chamber with the exterior of the chamber. The sleeves selectively cooperate with the two passages as the stem is slidably moved through the metering chamber and the reservoir.

The method of using this aerosol dispensing apparatus is simple. The stem is placed in a first, rest position, in which the dispensing passage is sealingly engaged by one of the chamber sealing sleeves. In the rest position, the stem is biased exteriorly of the container so that the bypass passage is positioned within the unfilled metering chamber. Accordingly, the metering chamber is fluidically isolated from both the main reservoir and from the exterior of the apparatus. The stem is then initially depressed inwardly of the chamber and reservoir into an empty position. In this position no active agent is present in the metering chamber, and no dispensing occurs, despite the communication of the metering chamber with the exterior via the dispensing passage. In this position, the bypass passage is sealingly engaged by the other chamber sealing sleeve. Accordingly, the main reservoir and the metering chamber remain fluidically isolated from one another.

The stem is then further depressed into a charging position. In this position, the inlet aperture of the dispensing passage is sealingly engaged by the additional sealing sleeve, which is mounted within the metering chamber. Accordingly, the metering chamber and the exterior of the apparatus are fluidically isolated. In this position, however, a portion of the bypass passage is moved into the main reservoir, thus placing the main reservoir and the metering chamber into fluidic communication via the bypass passage. This charges the metering chamber with a desired amount of fluid material to be dispensed. The stem is then released so that it will slide into a dispensing position. In this position, the main reservoir and metering chamber are again placed into fluidic isolation; the bypass passage moves into sealing engagement with the other chamber sealing sleeve, and back into the metering chamber. During this movement of the stem, the inlet aperture of the dispensing passage first moves out of engagement with the additional sealing sleeve and then into the metering chamber. During this time, fluid material from the metering chamber, e.g., drug and propellant, enters the dispensing passage inlet port, moves through the dispensing passage, and is dispensed through a spray nozzle of the dispensing passage. As the stem continues to be biased exteriorly, the nozzle continues to dispense a predetermined amount of fluid material held within the metering chamber. When the metering chamber is empty, the dispensing passage inlet port again moves into engagement with the one first sealing sleeve, and the apparatus again assumes the first, sealed rest position; in this position, external air is prevented from diffusing into the metering chamber. The apparatus is then ready to be operated again in a similar fashion.

In order to satisfactorily mix the material in the reservoir, the apparatus is shaken to uniformly distribute the active agent, e.g., drug, prior to depressing the stem charging the metering chamber with fluid material to be dispensed.

By using the present device, the disadvantages of conventional aerosol dispensers can be overcome by a relatively simple construction and operation. By filling the metering chamber immediately prior to administration, i.e., dispensing, of an active agent, there will not be enough time for an active agent and propellant in solution, suspension or emulsion to separate or partition into their respective phases. Accordingly, each unit dose dispensed will comprise an essentially uniform composition. This enables a user to periodically dispense uniform doses of active agents.

The present device can also dispense metered amounts of drugs or other active agents with increased precision, even with a relatively small metering chamber. By providing a relatively small metering chamber, relatively low volumes of propellant are required. Thus, by using a reduced amount of propellant, e.g., Freon, in each dispensed dose, the temperature of each dose will not be undesirably cold, and will reduce the discomfort felt by a user when using conventional dispensing apparatus, which inherently use relatively large amounts of cold propellant. This is particularly beneficial in nasal usage, although it is also advantageous in transdermal and oral drug administration.

The selective cooperation of the stem, i.e., its dispensing passage and bypass passage, with the three sealing sleeves prevents undesirable fluidic communication between the metering chamber and the exterior of the apparatus, and the metering chamber and main reservoir, respectively. Such selectively cooperable structure isolates the metering chamber from the main reservoir at all times except when the apparatus is in its refill, i.e., charging, position; this prevents any flow of active agent between the main reservoir into the metering chamber except during the period in which the metering chamber is charged with a predetermined amount of drug and propellant. The propellant is then quickly and easily dispensed from the apparatus in a precisely-metered amount by releasing pressure on the stem, so that the helical spring positioned between the stem flange and the outer surface apparatus will forcibly slide the stem exteriorly of the container to dispense a predetermined dose from the metering chamber.

BRIEF DESCRIPTION OF THE DRAWINGS

An embodiment of the present invention is disclosed in the accompanying drawings, wherein:

FIG. 1 is a sectional view of the dispensing apparatus of the present invention, shown in a first, rest position, in which the metering chamber is empty;

FIG. 2 is a sectional view of the apparatus of FIG. 1 in a second, empty position, after the stem has been partially depressed, and wherein the metering chamber is still empty;

FIG. 3 is a sectional view of the apparatus of FIG. 1 in its third, refill position, in which the stem is completely depressed and the metering chamber is charged with material from the reservoir; and FIG. 4 is a sectional view of the apparatus of FIG. 1 in a fourth, dispensing position, after the pressure on the stem has been released and in which fluid material in the metering chamber is dispensed to the exterior of the chamber;

FIG. 5 is a sectional view of a second embodiment of the apparatus of the present invention, shown in a rest position similar to that of the embodiment as shown in FIG. 1;

FIG. 6 is an illustration of the stem used in the dispensing apparatus of FIGS. 1-5;

FIG. 7 is an illustration of a second embodiment of a stem useable with the dispensing apparatus; and FIG. 8 is a cross-sectional view taken along line 8—8 of FIG. 7.

DETAILED DESCRIPTION

Referring now more specifically to FIGS. 1-4, various steps of the operation of metered aerosol dispensing apparatus 10 are illustrated. The apparatus includes container 11, which defines main reservoir 12 for storing pressurized fluid material. The fluid material can be, e.g., an emulsion, a solution, or a suspension of an active agent and a propellant. The active agent can be any drug administered nasally, transdermally, or orally. Specific examples of active agents contemplated for use with this dispensing apparatus include Rocephin, Propanalol, Thymosius, and interferon, which is designed to be suspended in a propellant medium within the container.

A metering chamber 13 can be positioned within the reservoir, as is FIGS. 1-4; alternately, the chamber can be attached exteriorly of the reservoir, as in FIG. 5. The metering chamber 13 includes a substantially bell-shaped member 14 which is securely connected to, or integral with, the inner surface of container 11. The metering chamber includes a pair of apertures 15 and 17 which respectively connect the metering chamber to the main reservoir and to the exterior of the chamber. Chamber sealing sleeves 16 and 18 are mounted within apertures 15 and 17, respectively. That portion of container 11 which is located between inturned flanges 19 of bell-shaped member 14 also comprises a part of the metering chamber. Aperture 17 is in substantial alignment with aperture 15 of container 11. An additional sealing sleeve 20 is positioned within member 14, between and in alignment with chamber sealing sleeves 16 and 18. Sleeve 20 is held within member 14 by spider 21. All of the sealing sleeves are generally annular, in alignment, and are adapted to slidably receive stem 22.

As best illustrated by FIG. 6, the stem is generally cylindrical, and includes an outer portion located exteriorly of the container and a generally annular flange 24 positioned adjacent the outer portion. Helical spring 26 is positioned around the stem between the underside of flange 24 and the outer surface of container 11; the spring serves to bias the stem exteriorly of the container; this biasing force is in addition to the outward pressure exerted on the stem by virtue of the pressurized contents. The stem can be depressed inwardly of the reservoir and metering chamber; its movement is limited by stop 23. The stem also includes dispensing conduit 28, which is adapted to fluidically interconnect metering chamber 13 with the exterior of the container, and bypass conduit 32, which is adapted to fluidically interconnect the metering chamber and main reservoir 12.

FIG. 7 illustrates an alternate construction for the slidable stem. Stem 40 includes dispensing conduit 28, identical to the dispensing conduit of stem 22. Instead of bypass conduit 32, however, stem 40 has a bypass passage consisting of a plurality of notches 42. Although four notches are shown, as is clear from the cross-sectional view of FIG. 8, any desired number of notches (one or more) can be provided. Each notch has a length greater than the width of one chamber sealing sleeve, so that it will be capable of fluidically interconnecting the main reservoir with the metering chamber, similar to the way in which bypass conduit 32 functions.

Dispensing conduit 28 includes inlet port 29 and nozzle 30. The nozzle remains on the exterior of the container during the entire operation of the device. Inlet port 29 is selectively cooperable with chamber sealing sleeve 16 and additional sealing sleeve 20, and can be positioned within metering chamber 13, as will be described in greater detail hereinafter.

Similarly, bypass conduit 32 includes inlet port 33 and outlet port 34. The outlet port is positioned within metering chamber 13 throughout the operation of the dispensing apparatus. Inlet port 33 is selectively positionable within metering chamber 13, within reservoir 12, and is selectively cooperable with sealing sleeve 18 during operation of the apparatus.

Whenever inlet port 33 (FIG. 6) or the ends of notches 42 located farthest from flange 24 (FIG. 7) are located within the chamber sealing sleeve at the junction of the main reservoir and metering chamber, or are located in member 14, the bypass passages are considered to be within the metering chamber.

By slidably moving the stem through the sealing sleeves, metering chamber 13 can be selectively placed into fluidic communication with either the reservoir or the exterior of the container, or can be isolated from both the reservoir and the exterior.

The method of using the apparatus begins with the apparatus in a first rest position. In this position, the metering chamber is fluidically isolated from both the exterior of the apparatus and from the main reservoir. As best shown in FIG. 1, stem 22 is biased outwardly by helical spring 26. In this first position, dispensing conduit inlet aperture 29 is sealingly engaged and surrounded by chamber sealing sleeve 16. This prevents fluidic communication between metering chamber 13 and the exterior of the chamber. In this rest position, the metering chamber is empty, and by virtue of the positioning of bypass conduit 32 within the metering chamber, there is no fluidic communication between the empty metering chamber and filled main reservoir 12. The metering chamber is thus fluidically isolated from both the exterior of the apparatus and from the main reservoir.

Prior to dispensing a metered amount of fluid material from the container, the contents of reservoir 12 are mixed, e.g., by shaking, to disperse the active agent uniformly in the propellant.

The stem is then partially depressed; FIG. 2 illustrates the apparatus in its second, empty position. The stem is depressed into reservoir 12 and chamber 13 against the biasing force exerted by helical spring 26. In the empty position, fluidic communication between empty metering chamber 13 and the exterior of the apparatus is established by movement of the stem, which positions dispensing inlet port 29 within metering chamber 13. Because the inlet port is no longer sealed by chamber sealing sleeve 16, the dispensing conduit provides fluidic communication between the chamber and the exterior of the apparatus. At the same time, the metering chamber is still isolated from the main reservoir; bypass conduit inlet port 33 is sealingly engaged by sealing sleeve 18. Accordingly, in the empty position, metering chamber 13 remains isolated from the main reservoir, and void of any fluid material to be dispensed.

Further depression of the stem places the apparatus in a third, charging position, as shown in FIG. 3. In this position, metering chamber 13 is placed into fluidic communication with main reservoir 12 via bypass conduit 32. In this position, stem flange 24 is in substantial abutment with stop 23. The metering chamber is isolated from the exterior of the chamber by virtue of the sealing engagement of additional sealing sleeve 20 about dispensing conduit inlet port 29. This prevents fluid flow from metering chamber 13 to the exterior of the chamber. In this position, bypass conduit inlet port 32 is positioned within main reservoir 12. As a result, the active agent and propellant flow from the main reservoir into the metering chamber to charge the metering chamber with a desired amount of fluid material to be dispensed.

In the final operational step of the apparatus, the pressure previously exerted by a user on stem 22 is released. This enables spring 26 (and the pressure exerted by fluid in the apparatus) to again constitute means for biasing stem 22 exteriorly of the container. As the stem moves outwardly under the biasing force, metering chamber 13, now charged with the active agent and propellant, is again isolated from reservoir 12. This occurs because bypass conduit inlet port 33 moves from reservoir 12 into sealing engagement with chamber sealing sleeve 18, and then the entire bypass conduit moves into the metering chamber. This fluidically isolates the metering chamber from the reservoir. At the same time, dispensing conduit inlet port 29 moves out of engagement with sealing sleeve 20, and into metering chamber 13. Because the metering chamber is now charged with the active agent and propellant to be dispensed, material in the metering chamber flows through inlet port 29, dispensing conduit 28, and outwardly of the apparatus via nozzle 30 in the form of a spray. Outward movement of the stem and dispensing of fluid material from the metering chamber continues until the metering chamber is emptied, and until dispensing conduit inlet port 29 is once again sealingly engaged by chamber sealing sleeve 16. At this point, the apparatus again assumes the first rest position of FIG. 1, and is in position to begin another dispensing operation.

An alternate embodiment of the dispensing apparatus is illustrated in FIG. 5. This apparatus basically differs from the apparatus of FIGS. 1-4 in that metering chamber 35 is located exteriorly of container 11, rather than inside the container; otherwise, the apparatus generally functions as described above with respect to FIGS. 1-4. Metering chamber 35 is defined by substantially bell-shaped member 36 and that portion of container 11 located between member flanges 37. Chamber 35 includes apertures 39 and 17, and chamber sealing sleeves 15 and 18 are respectively positioned with these apertures. Stop 38 is attached to the exterior of member 36 and is adapted to limit movement of stem 22 by engaging flange 24, as stop 23 functions in FIGS. 1-4.

In both dispensing apparatus shown, the substantially bell-shaped members (14 and 36) are shown as being attached to container 11; alternatively, these members could be formed integrally with the container.

The apparatus can thus be successively operated to dispense a plurality of uniform and precise doses of the active agent and propellant.

It is believed that the advantages and improved results furnished by the method and apparatus of the present invention are apparent from the foregoing description of the preferred embodiment of the invention. Various changes and modifications may be made without departing from the spirit and scope of the invention, as described in the claims that follow.

It is of course understood that the stem can be provided in a conventional manner with a protuberance or abutment to restrict its outward movement. In this way, the possibility of inadvertent removal of the stem from the dispensing system would be avoided.

What is claimed is:

1. Aerosol dispensing apparatus for dispensing metered amounts of fluid material from a main reservoir defined by a container, said apparatus comprising:
   (a) a metering chamber having a first aperture that connects the metering chamber to said main reservoir and a second aperture that connects the metering chamber to the exterior of said metering chamber;
   (b) a first sealing sleeve mounted on the first aperture;
   (c) a second sealing sleeve mounted on the second aperture;
   (d) a third sealing sleeve mounted within the metering chamber, all the sleeves being in substantial alignment; and
   (e) a stem being positioned for slidable movement within the sleeves, having a dispensing passage adopted to selectively fluidically connect the metering chamber to the exterior of the metering chamber, and a bypass passage adapted to selectively fluidically connect the metering chamber to the main reservoir,
   (i) at a first position of the stem, said dispensing passage being located such that the metering chamber is fluidically isolated from the exterior of the metering chamber, and the bypass passage being located such that the meter chamber is fluidically isolated from the main reservoir;
   (ii) at a second position of the stem, said dispensing passage sealingly engaging said third sealing sleeve such that said metering chamber is fluidically isolated from the exterior of said container and said bypass passage being located such that said metering chamber and said main reservoir are in fluidic communication; and
   (iii) at a third position of the stem, said dispensing passage being located such that the metering chamber is in fluidic communication with the exterior of said metering chamber, and said bypass passage being sealingly engaged by the first sealing sleeve such that said metering chamber is fluidically isolated from the main reservoir.

2. Dispensing apparatus in accordance with claim 1 wherein said dispensing passage comprises a conduit having an inlet port and a nozzle.

3. Dispensing apparatus in accordance with claim 2 wherein said bypass passage comprises a conduit having an inlet port and an outlet port.

4. Dispensing apparatus in accordance with claim 2 wherein said bypass passage comprises at least one notch on said slidable stem.

5. Dispensing apparatus in accordance with claim 2 wherein said bypass passage comprises four notches on said slidable stem.

6. Dispensing apparatus in accordance with claim 1 wherein said metering chamber includes part of a wall of said container.

7. Dispensing apparatus in accordance with claim 6 wherein said metering chamber is located within said main reservoir.

8. Dispensing apparatus in accordance with claim 6 wherein said metering chamber is located exteriorly of said main reservoir.

9. Dispensing apparatus in accordance with claim 1, wherein a portion of said stem extends exteriorly of said container, said stem portion including a generally annular flange, said apparatus further comprising a helical spring positioned outside of said metering chamber to normally bias said stem outwardly from said metering chamber.

10. Dispensing apparatus in accordance with claim 9 wherein said helical spring is located between said stem flange and said metering chamber.

11. Dispensing apparatus in accordance with claim 1 wherein said stem is generally cylindrical and the sealing sleeves comprise substantially annular members.

12. Dispensing apparatus in accordance with claim 1 wherein the dispensing and bypass passages comprise distinct passages.

13. Apparatus in accordance with claim 1 wherein said metering chamber includes a member which is substantially bell-shaped.

14. Apparatus in accordance with claim 1 wherein said stem includes a flange and said metering chamber has a stop adapted to limit movement of said stem by engaging said flange when said stem is depressed into said chamber and reservoir.

15. Aerosol dispensing apparatus for dispensing metered amounts of fluid material from a main reservoir defined by a container, said apparatus comprising:
   (a) a metering chamber having a pair of apertures that respectively connect the metering chamber to said main reservoir and to the exterior of said metering chamber;
   (b) a chamber sealing sleeve mounted in each aperture, and an additional sealing sleeve mounted within the metering chamber, all of the sleeves being in substantial alignment; and
   (c) a slidable stem having a dispensing passage and a bypass passage, said stem being positioned within and cooperable with the sleeves so that said bypass passage is adapted to selectively fluidically interconnect said main reservoir with said metering chamber, and said dispensing passage is adapted to selectively fluidically interconnect said metering chamber with the exterior thereof and said slidable stem being slidable into a plurality of positions as follows:
   (i) a first rest position, in which said bypass passage is located within said metering chamber, and herein said dispensing passage is sealingly engaged by one of said chamber sealing sleeves, whereby said metering chamber is fluidically isolated both from said reservoir and from the exterior of said metering chamber;
   (ii) a second, charging position, in which said stem is depressed into said chamber and reservoir, said dispensing passage being sealingly engaged by said additional sealing sleeve, a portion of said bypass passage being positioned within said main reservoir, whereby said metering chamber and said main reservoir are in fluidic communication via said bypass passage so as to charge said chamber with fluid material from said reservoir, and whereby said metering chamber if fluidically isolated from the exterior of said container; and (iii) a third, dispensing position, in which said dispensing passage is positioned within said metering chamber, and wherein said bypass passage is sealingly engaged by the other of said chamber sealing sleeve, whereby said metering chamber is fluidically isolated from said main reservoir, and said metering chamber is in fluidic communication with the exterior of said chamber so as to dispense a metered amount of fluid material from said chamber and through a nozzle of said dispensing passage.

16. Dispensing apparatus in accordance with claim 15, wherein said main reservoir is filled with fluid material in all of said three positions, and wherein said metering chamber is empty in said first position and charged with said fluid material in said second and third positions.

17. Dispensing apparatus in accordance with claim 15 wherein said fluid material comprises an active agent and a propellant.

18. Dispensing apparatus in accordance with claim 17 wherein said active agent comprises interferon.

19. A method of using an aerosol dispensing apparatus to dispense metered amounts of fluid material from a main reservoir defined by container, the apparatus having a metering chamber having a pair of apertures that respectively connect the metering chamber to said main reservoir and to the exterior of said reservoir, a chamber sealing sleeve mounted within each aperture, an additional sealing sleeve mounted within said metering chamber, all of said sleeves being in substantial alignment, a slidable stem having a dispensing passage and a bypass passage, said stem being positioned within and cooperable with the sleeves and having a portion which is located exteriorly of said metering chamber, and means for biasing said stem exteriorly of said metering chamber, said method comprising:

(a) positioning said stem in a first, rest position in which said metering chamber is empty, said stem being biased exteriorly of said metering chamber so that said bypass passage is located within said metering chamber and said dispensing passage is sealingly engaged by one of said chamber sealing sleeves, whereby said metering chamber is fluidically isolated both from said main reservoir and from the exterior of said metering chamber;

(b) charging said metering chamber with fluid material to be dispensed by depressing said stem inwardly of said chamber and reservoir, said dispensing passage being sealingly engaged by said additional sealing sleeve, whereby said metering chamber is thus fluidically isolated from the exterior of said chamber, a portion of said bypass passage being positioned within said main reservoir, whereby said metering chamber is placed into fluidic communication with said main reservoir via said bypass passage; and (c) dispensing said fluid material from said metering chamber by releasing said stem, whereby said biasing means forces said stem exteriorly of said container, said bypass passage being sealingly engaged by the other of said chamber sealing sleeves, whereby said metering chamber is fluidically isolated from said main reservoir, said dispensing passage being positioned within said metering chamber, whereby said metering chamber is placed into fluidic communication with the exterior of said chamber via said dispensing passage, and said fluid material is sprayed outwardly from said dispensing passage.

20. A method in accordance with claim 19 further comprising shaking said apparatus to uniformly mix an active agent and a propellant in the main reservoir prior to depression of said stem.

* * * * *